Nov. 23, 1937.  H. R. FOWLER  2,100,136
VEHICLE WHEEL MOUNTING FOR INDEPENDENT SHIFTING
Filed April 23, 1934  3 Sheets-Sheet 1
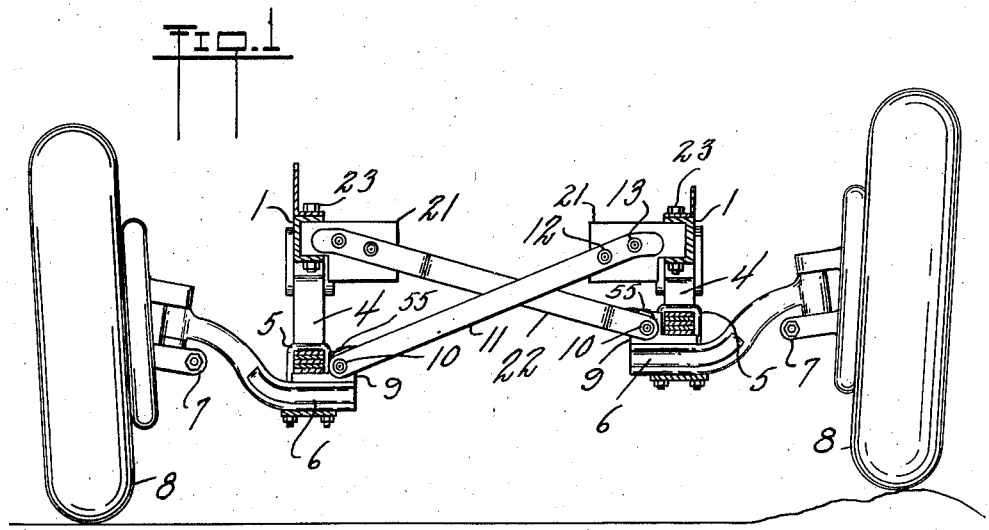
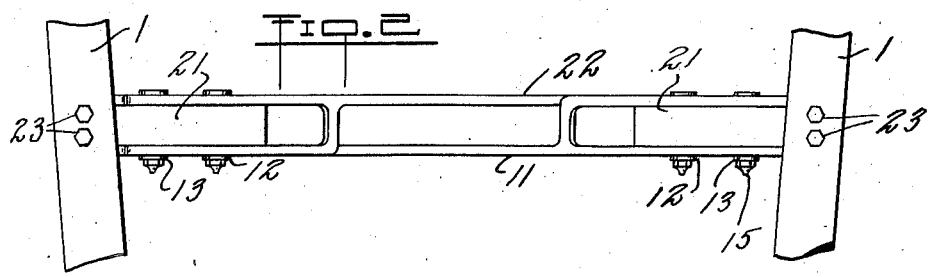
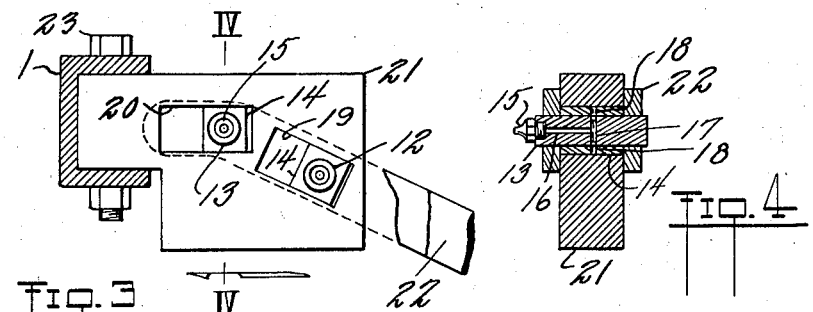
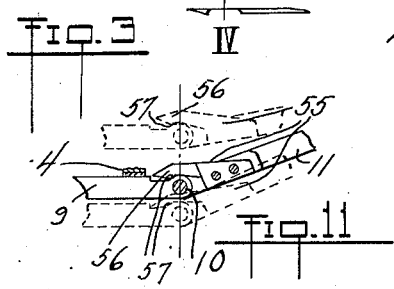
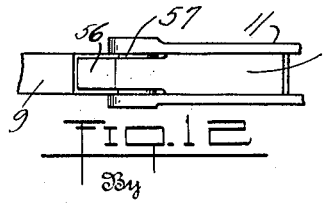
Inventor
Harry R. Fowler
By
Attorney

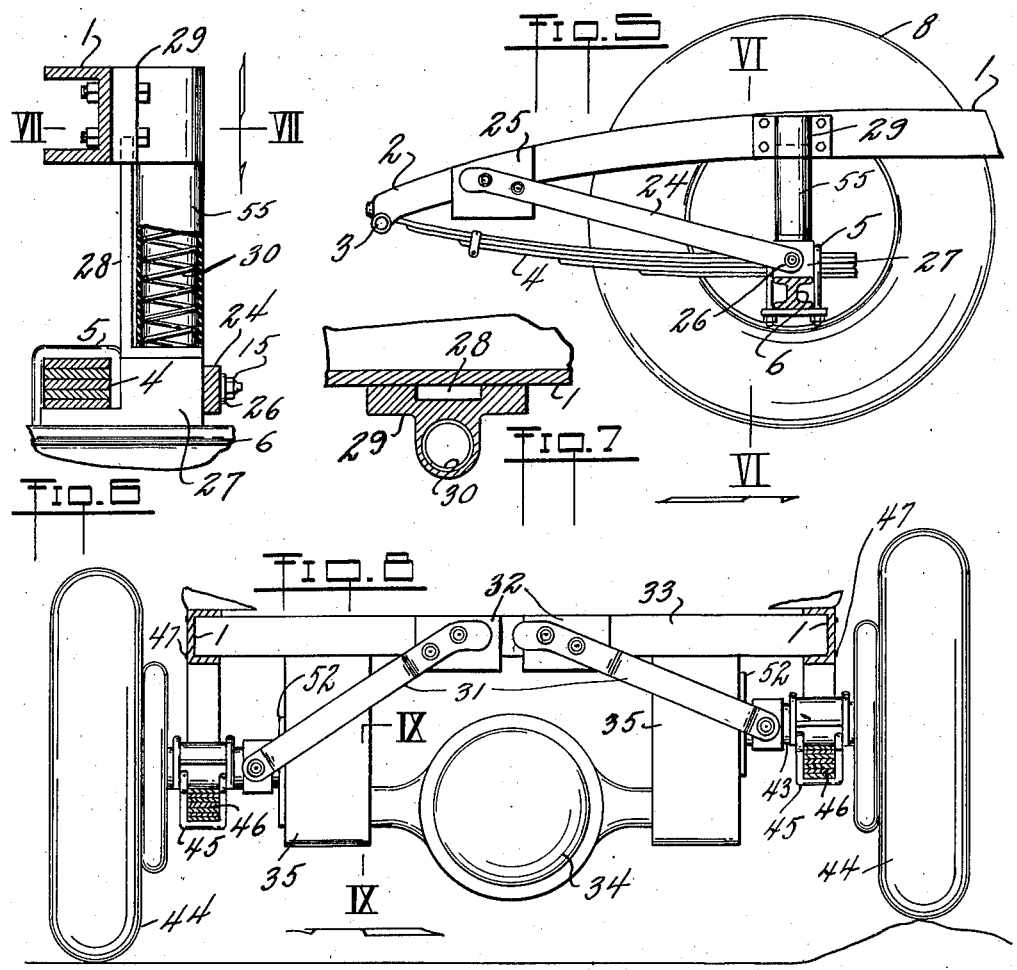
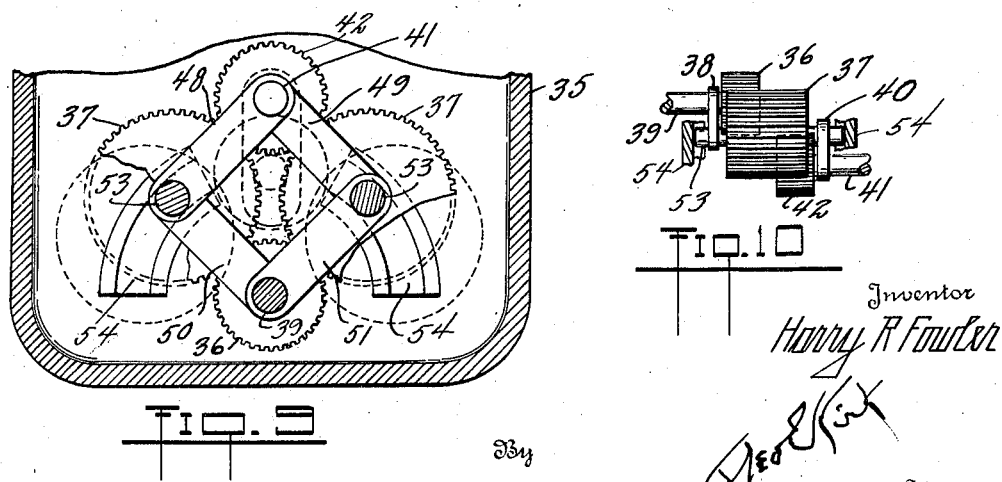

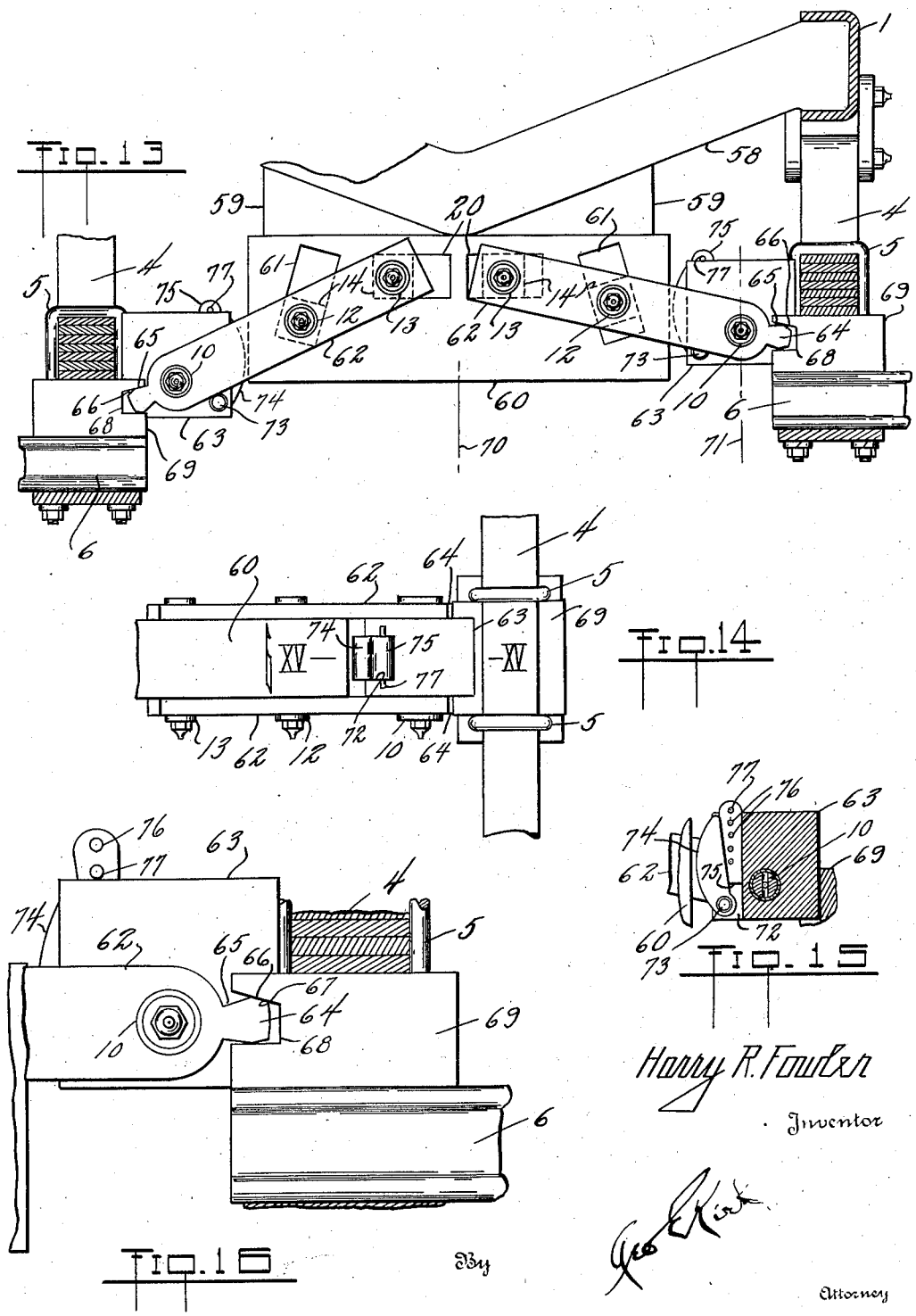

Patented Nov. 23, 1937

2,100,136

UNITED STATES PATENT OFFICE 2,100,136

VEHICLE WHEEL MOUNTING FOR INDEPENDENT SHIFTING

Harry R. Fowler, Toledo, Ohio

Application April 23, 1934, Serial No. 721,984

9 Claims. (Cl. 267—19)

This invention relates to vehicle wheel mountings.

This invention has utility for wheel supports or connections between the wheel axle and the chassis, more especially for motor vehicles to permit aligned wheels to have independent movement apart from materially disturbing the spaced relation between such wheels.

Referring to the drawings:

Fig. 1 is a fragmentary view of a non-driving or the forward pair of vehicle wheels, say of an automobile;

Fig. 2 is a plan of the connection between the chassis portions of Fig. 1;

Fig. 3 is an enlarged view in detail of a chassis mounting portion or block;

Fig. 4 is a section on the line IV—IV, Fig. 3;

Fig. 5 is a side view of an automobile wheel and its mounting, say a non-driving wheel at the right forward portion of the vehicle having an embodiment of the invention herein shown as in alignment with the frame or chassis instead of crosswise as in Fig. 1;

Fig. 6 is a section on the line VI—VI, Fig. 5;

Fig. 7 is a section on the line VII—VII, Fig. 6;

Fig. 8 is a fragmentary view of a driving pair of wheels, say for the rear section of the vehicle;

Fig. 9 is a section on the line IX—IX, Fig. 8;

Fig. 10 is a view in plan of features of the device for single set up instead of dual assembly for the transmission as in Fig. 9;

Fig. 11 is a side view of the axle terminus connection for the spacing link, parts being broken away to show longitudinal thrusting control for the link; the dotted lines showing the shiftings from different positions for straight line movement;

Fig. 12 is a plan view of the detail of Fig. 11;

Fig. 13 is an additional view of a front wheel assembly of an embodiment of the device hereunder;

Fig. 14 is a plan view of the axle connection to the chassis as independent of the springs and involving the control features hereunder;

Fig. 15 is a section on the line XV—XV, Fig. 14; and

Fig. 16 is an upper limit position of a throw or control as shown at low at the left of Fig. 13 and at mid-point at the right of Fig. 13.

Chassis involves channel side portions 1 to carry the motor vehicle body. Such channel portions 1 have forward termination in overhang 2, wherein pivot pin 3 may mount semi-elliptic leaf spring 4 extending to mounting 5 anchoring with axle section 6. At the axle section 6 outwardly from the chassis there is steering knuckle 7 to mount wheel 8.

At the axle section 6 between such and the spring 4, there may be inserted block 9 carrying pivot pin 10 from which extends link 11 inwardly and upwardly, there to have fixedly mounted therein pins 12, 13. These pins between the forked upper end of the bar 11 are fixed with such forked portions and carry blocks 14. Pressure lubrication 15 is in communication through ports 16 and ducts 17, 18, with the exterior of the pin and interior and exterior of the respective blocks effectively to lubricate such blocks in guide means 19, 20. The direction of these guide means 19, 20, is determined by the movement of the pivot pin 10 in a plane perpendicular to the horizontal extent of the chassis. That is, the pivot pin 10 works directly up and down in its path toward and from the chassis instead of flexing to move in or out. This direction of upward and downward vertical movement for the pin 10 determines the direction for the respective guide means 19, 20, in block 21. The come and go of the axle section 6 toward and from the chassis is thus definitely directed and controlled as the spring 4 yields and comes back under variations of load or road conditions. The companion wheel has a similar bar 22 reversed as to its terminal forked portions from the bar 11. The blocks 21 are anchored in the channel portions 1 of the chassis by bolts 23.

In the come and go action between the wheels and the chassis, it is thus seen that these wheels may shift relatively to the roadway independently of each other and without contributing the full tilt factor to the chassis, for the respective wheels act independently, and their initial position whether vertical or pitched as for the forward steering wheels, may be a direction of plane which is a spacing maintained between the wheels by the give device or mounting herein. This avoids any in and out shifting which might tend to wear the treads of the tires and assures the maintenance of the wheel width as a constant and is a factor of simplicity and stability in taking road condition variations especially at high speed. The normal vehicle structures are maintained with the elimination of intermediate direct connecting section for the axle and there is thus a reduction of the weight which is not carried by the spring of the vehicle. Thus the shock receiving mass as to road operation is reduced.

This straight line control as shown in Fig. 1 is transverse of the chassis. In Fig. 5, the control direction is by bar 24 similar to the bars 11, 22, in line with the direction of the chassis channel 1. Block 25 is similar to the blocks 21 in that it has its guides 19, 20, therein shielded by the forked termini of the bar 24 and subjected to pressure lubrication keeping such clear. Pivotal connection 26 adjacent axle section 6 is transverse of the vehicle instead of lengthwise of the vehicle as is the pivotal connection 10. This pivotal connection 26 is in block 27 from which extends upright portion 28 having telescopic movement relatively to guide 29. As desired, there may be introduced in this telescopic connection compression spring 30 as a supplement to the yielding means 4 to maintain give operation for come and go action between the axle section 6 and the chassis 1.

Bars 31, in lieu of the bars 11, 22, may cooperate from blocks 32 at rear cross portion 33 of the chassis 1 when it is desired to have this independent movement for rear or power driven wheels of the vehicle. In this instance, differential 34 may be swung by housings 35 from the chassis cross portion 33 and thus have such weight carried by the springs instead of by the wheels and so contribute to a reduction in the amount of mass to receive the shock in travel along a highway. In the housings 35 and driven from the differential 34 are pinions 36 in mesh with intermediate pinions 37. This pinion 37 has swing link 38 from shaft 39 carrying the pinion 36. From this pinion 37, there is additional swing link 40 to rear axle section 41 carrying pinion 42 and connected to drive the axle section 41 in rear axle housing 43. This rear axle section 41 is thus effective to drive rear wheel 44. The axle section housing 43 has connection 45 with semi-elliptic spring section 46, the leaves of which are connected by shackle 47 to the chassis 1.

In this assembly where there is but one link from the shaft 39 and one link to the axle section 41, there may be a range of relative movement in the come-go action as permitted about the intermediate pinion 37 to compensate the action of the yieldable means or spring between the chassis and the axle section. When it is not desired to avail of such range of throw in the operation of the gearing, the links 38, 40, may be in duplicate. In such assembly there may be links 48, 49, 50, 51, on opposite sides of the gears, thus giving stability to the set up. As the axle section 41 protrudes from the housing 35, there is shield 52 to keep out entrance of foreign matter. The pinions 37 may be mounted on shafts 53, the termini thereof being slidable in ways 54 of the housing 35 as a feature of stability in operation. Flexible sheath 55 envelopes the spring 30.

The links 11, 22, in their normal cooperation have longitudinal shifting for straight line or vertical movement of the pivot bearings or pins 10. This is effected or controlled by the movable mountings at the blocks 21 shown at the guides 19, 20. Control for this longitudinal shifting is additionally and effectively brought about by block 55 in the link adjacent the pin 10. This block 55 has overhang cam 56 coacting with the cam face 57 adjacent the pin 10. As the angle of the link 11 shifts relatively to the axle section 6, this cooperative cam structure 56, 57, has a longitudinal or thrust directing control on the link toward maintaining the straight line travel for the pin 10.

In the instance wherein the side channels 1 of the chassis have a forward drop front cross connection 58 (Fig. 13) bracket 59 may be mounted thereon as a carrier for block 60 in which may be located guide means 20 and 61 in pairs analogous to the guide means 19, 20. In this assembly there is short connection between the front wheel axle section 6 along the line of the links 31 (Fig. 8) for the rear axle sections and departing from the cross links 11, 22, of Fig. 1. In these guide means or slots 20, 61, may be located the blocks 14 having therein the pins 13 and pressure lubrication fittings 15. Herein these pins 13 are in links 62 extending to pivot pins 10 in blocks 63. These links 62 may be in forks or in pairs to embrace the block 60 and the block 63, and terminally adjacent the pin 10 may be provided with tooth 64 having cam sides 65, 66, to coact with cam face 67 of notch or rack tooth 68 in block portion 69 fixed with the main block 63 at the axle section 6 and adjacent the leaf spring 4. It is to be noted that in mid-position (Fig. 13, right), the cooperation between the tooth 64 of the link 62 and the tooth 68 of the block 69 is one of rolling action.

In the directed cooperation sought hereunder, descent of the block 69 to increase the spacing thereof from the chassis 1 is a straight line travel for the pin 10 perpendicular to the roadway or the plane of the chassis 1 and in such increased spacing, cam side or face 65 of the tooth 64 coacts with cam face 67 of the tooth 68, thereby crowding the block 69 against shortening the distance between mid-point line 70 of the vehicle and vertical line 71 of the travel for the pin 10. At the extreme or the upward position (Fig. 16) the cam face 66 of the tooth 64 in acting against the cam face 67 of the tooth 68 maintains the spacing against contraction for the distance between the center line 70 and the vertical line 71 for travel of the pin 10. This is a supplemental directing means for the thrust in addition to that determined by the intersecting direction for the guides 20, 61.

In the set up herein of a central block 60, say on type of car wherein the distance between the springs may be twenty-four inches and the length of this block 60, eleven inches, and seven inch dimensions for the side blocks, there is a clearance which may approximate one-half inch between the block 63 and the block 60. Supplemental provision may be made hereunder against end thrust action on the links 62 reducing this distance. To this end in the block 63 there may be cut-out channel 72. In this cut-out, pivot pin 73 may mount cam cheek 74 to protrude from this channel 73. The extent of the outward thrusting of this cam face 74 toward the block 60 may be determined by wedge 75 having a plurality of opening 76 in one of which may be inserted pin 77, thereby adjusting the inward thrusting limit for the cheek or cam face 74.

There is here a positive stop against inward thrusting with this provision for independent up and down movement of the front wheels of the vehicle and what has been suggested as "knee action" operation. While the linkages have been shown with thrust directing control in the straight line operation as to multiple interaction, these devices may be selectively effective independently of plural installation.

What is claimed and it is desired to secure by Letters Patent is:

1. A vehicle chassis, a wheel, an axle section for the wheel, spring means between the chassis and section for yieldably spacing the wheel from the chassis, and a directing controller connected between the section and chassis comprising a link fixedly pivotally connected to the axle section and extending therefrom, and a pair of relatively movable spaced members having connection to the chassis, each providing a bearing shiftable relatively to the chassis and having spaced connection to the link.

2. A vehicle chassis, a wheel, an axle section for the wheel, spring means between the chassis and section for yieldably spacing the wheel from the chassis, and a directing controller connected between the section and chassis comprising a link pivotally connected to the axle section adjacent the spring means and extending transversely of the chassis, and a pair of members movably connected to the chassis and providing spaced bearing connections to the link.

3. A vehicle chassis, a pair of aligned wheels, an axle section for each wheel, spring means between the chassis and sections for yieldably spacing the wheels independently from the chassis, and directing controller mechanism connected between the sections and chassis comprising independently for each wheel a link pivotally connected to an axle section and extending toward the other axle section, and a pair of relatively movable members providing spaced bearing connections to the link away from the pivotal connection of the link with the axle section.

4. A vehicle chassis, a wheel therefor, an axle section for the wheel, leaf spring means extending lengthwise of the chassis between the chassis and axle section for yieldably spacing the wheel from the section, and a directing controller between the section and chassis comprising a bar having one of its terminals pivotally connected to the section, and a pair of bearings having connections with the bar and spaced from each other along the bar away from the section, said bearings each being movable relatively to the chassis and having connections away from the bar for limiting shifting of the bar as to the chassis.

5. A vehicle chassis, a wheel, an axle section for the wheel, spring means between the chassis and section for yieldably spacing the wheel from the chassis, and a directing controller between the section and chassis comprising a bar between the section and chassis, a pivotal connection for the bar at the section, and a fully slidable connection for the bar at the chassis, said slidable connection including a pair of pins carried by the bar and a block fixed with the chassis having direction guide means for the pins.

6. A vehicle chassis, a wheel, an axle section for the wheel, spring means between the chassis and section for yieldably spacing the wheel from the chassis, and a directing controller between the section and chassis comprising confining means against transverse shifting of the section relatively to the longitudinal extent of the chassis, said confining means including a link, a bearing pin for one end of the link, and link thrusting means connecting the link relatively reciprocably as to the chassis and coacting adjacent the bearing for limiting shifting of the link.

7. A vehicle chassis, a wheel, an axle section for the wheel, spring means between the chassis and section for yieldably spacing the wheel from the chassis, and a directing controller between the section and chassis comprising confining means limiting the shifting of the section perpendicularly to the plane of the chassis, said confining means including a link, a bearing pin for one end of the link, and link thrusting means connecting the link relatively reciprocably as to the chassis and coacting adjacent the bearing for limiting shifting of the link, there being slotted guide means providing movable mounting for the other end of the link, said link thrusting means positioning the link as to the movable mounting.

8. A vehicle chassis, a wheel, an axle section for the wheel, spring means between the chassis and section for yieldably spacing the wheel from the chassis, and a directing controller between the section and chassis comprising confining means limiting the shifting of the section perpendicularly to the plane of the chassis, said confining means including a link, a bearing pin for one end of the link, and link thrusting toothed means coacting adjacent the bearing for determining longitudinal shifting of the link.

9. A vehicle chassis, a wheel, an axle section for the wheel, spring means between the chassis and section for yieldably spacing the wheel from the chassis, and a directing controller between the section and chassis comprising confining means limiting the shifting of the section perpendicularly to the plane of the chassis, said confining means including a link, a block fixed with the chassis, a block fixed with the axle section, mounting means coacting between the link and the respective blocks, and spacer means between the blocks.

HARRY R. FOWLER.